United States Patent
McRae (10) Patent No.: US 9,459,512 B2
(45) Date of Patent: Oct. 4, 2016

(54) FIPEL BACKLIGHT PANEL WITH PIXEL COLOR FILM FOR DISPLAYS

(71) Applicant: Vizio Inc, Irvine, CA (US)

(72) Inventor: Matthew McRae, Irvine, CA (US)

(73) Assignee: Vizio, Inc, Irvine, CA (US)

( * ) Notice: Subject to any disclaimer, the term of this patent is extended or adjusted under 35 U.S.C. 154(b) by 229 days.

(21) Appl. No.: 13/859,600

(22) Filed: Apr. 9, 2013

(65) Prior Publication Data

US 2014/0300846 A1    Oct. 9, 2014

(51) Int. Cl.
G02F 1/1335    (2006.01)
G02F 1/23    (2006.01)
G02B 26/00    (2006.01)
G09G 3/34    (2006.01)

(52) U.S. Cl.
CPC ........... *G02F 1/23* (2013.01); *G02F 1/133603* (2013.01); *G09G 3/3413* (2013.01); *G09G 3/3426* (2013.01); *G02B 26/005* (2013.01); *G09G 3/3406* (2013.01); *G09G 2320/0666* (2013.01)

(58) Field of Classification Search
CPC .................. G02F 1/133617; G02F 1/133621; G02F 1/13762; G02F 1/23; G02F 2/02; G02F 2201/44; G09G 3/3406; G09G 2320/0666; C09K 11/00; C09K 2019/0433; H01J 61/42; H01L 31/12; H01L 31/125; H01L 51/50
See application file for complete search history.

(56) References Cited

U.S. PATENT DOCUMENTS

| | | | |
|---|---|---|---|
| 5,402,182 A * | 3/1995 | Sugiura .................... | 348/655 |
| 5,926,239 A * | 7/1999 | Kumar et al. ............ | 349/69 |
| 6,169,529 B1 * | 1/2001 | Hansen et al. ........... | 345/74.1 |
| 6,455,208 B1 | 9/2002 | Yamashiki et al. | |
| 6,600,533 B2 | 7/2003 | Ono | |
| 7,576,478 B2 * | 8/2009 | Hikmet ..................... | 313/110 |
| 8,329,893 B2 | 12/2012 | Shelby et al. | |
| 8,421,910 B2 * | 4/2013 | Kawakami ............... | 348/371 |
| 8,552,659 B2 * | 10/2013 | Ashdown et al. ........ | 315/291 |
| 2003/0214691 A1 * | 11/2003 | Magno ............. | G09G 3/2803 313/498 |
| 2011/0128483 A1 | 6/2011 | Park et al. | |
| 2012/0206806 A1 | 8/2012 | Weber | |
| 2014/0340431 A1 * | 11/2014 | Yamakawa ............... | 345/690 |

OTHER PUBLICATIONS

Effect of multi-walled carbon nanotubes on electron injection and charge generation in AC field-induced polymer electroluminescence Yonghua Chen, Gregory M. Smith, Eamon Loughman, Yuan Li, Wanyi Ni, David L. Carroll, Organic Electronics 14 (2013) 8-18.

* cited by examiner

*Primary Examiner* — Paisley L Arendt (74) *Attorney, Agent, or Firm* — Law Office of Scott C Harris, Inc (57) ABSTRACT

A display system, having an emissive body, emitting light in a way that is color temperature controllable. The light emission can be from zones. The emissive body can be a FIPEL type device with a first transparent conductive coating over a light emitting substrate. The zones are each separately controllable for color temperature.

20 Claims, 5 Drawing Sheets

Figure 1a  Figure 1B

Figure 2 – Typical LCD Panel With
Diffuser, Polarizers and Color Filter

Figure 3 – Single FIPEL Color Balanced Panel Backlight With Color Filters

Figure 4 – FIPEL Pixel Groups With Color Film

Figure 5 – FIPEL Pixels Without Color Film or LCD panel

FIPEL BACKLIGHT PANEL WITH PIXEL COLOR FILM FOR DISPLAYS

BACKGROUND

Backlight assemblies for digital LCD televisions have evolved in recent years. Backlight assemblies used to emit light generated by Cold Cathode Fluorescence (CCFL) tubes. These backlight assemblies consumed large quantities of power and required light guides and diffusers to eliminate differences in light density before presenting the light to the LCD panel.

LED backlight assemblies are commonplace in modern LCD televisions. LED backlight assemblies tend to fall into two categories of edge lit backlights and direct LED backlights. In edge lit backlight assemblies, LEDs inject light into a sheet composed of plastic with good optical properties. The edge lit plastic panel receives the light and changes its direction by 90 degrees and emits the light out of the front facing surface of the panel. The light is then passed through a plastic diffusor sheet and on to the LCD panel. The LCD light gates in the LCD panel are polarized such that unpolarized light will suffer degradation passing through the LCD gates. To overcome this problem, a polarizer sheet aligned to the polarization of the LCD gates is placed between the backlight diffusor sheet and the LCD panel assembly. Another sheet of plastic is generally adhered to the back surface of the LCD panel. This plastic film contains colored dots aligned with the LCD gates in the LCD panel. These dots are colored Red, Blue and Green so that colored light is presented to the LCD gates. Another polarized sheet of plastic is adhered to the front surface of the LCD panel to repolarize the light leaving the LCD panel so that it is directed in a controlled manner that enhances the viewing experience.

SUMMARY

Applicants recognize that this conventional technique uses many different components up to and including the LCD panel. Embodiments are described herein that reduce the parts count and also allow various functions.

An apparatus, method and system is also described for controlling white balance and color temperature by modulating the supply current for a Field Induced ElectroLuminescence (FIPEL) backlight source.

DETAILED DESCRIPTION

Figure 2:
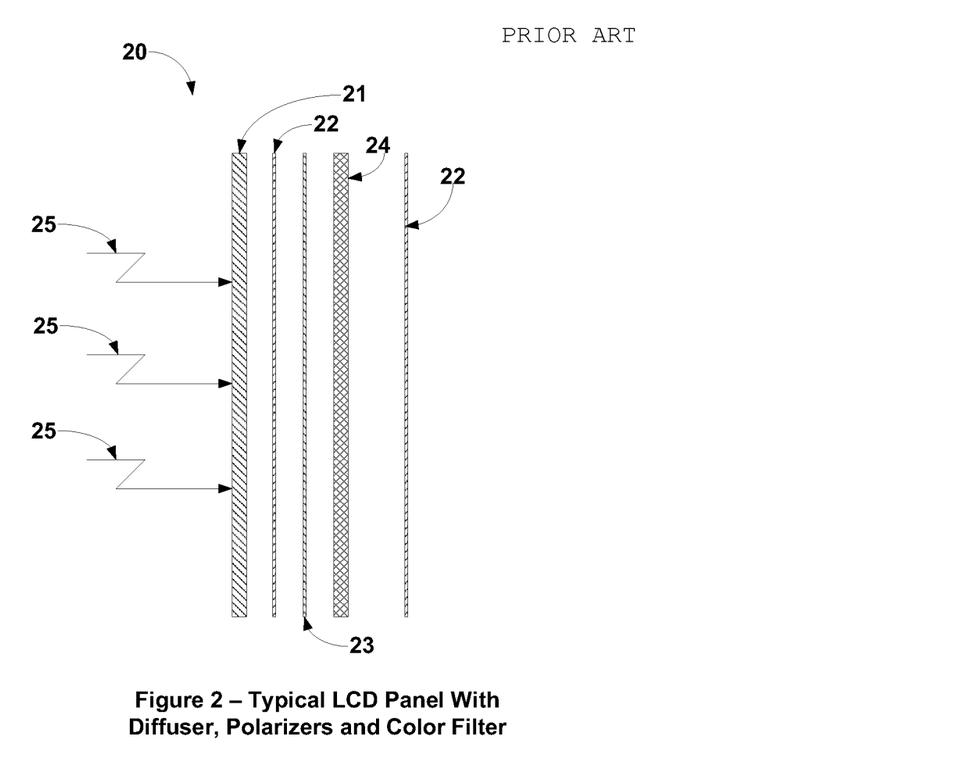
FIG. 2 shows a typical LCD Panel With Diffuser, Polarizers and Color Filter.

Current backlit LCD display panel assemblies commonly used in digital televisions contain a substantial number of components. An exemplary panel is shown in FIG. 2. These LCD panel assemblies 20 require that light 25 emitted from the back light be diffused by a diffuser 21, polarized by a polarizer 22 then passed through a color filter film 23 with colored microscopic dots aligned with the sub-pixels in the LCD panel. The pixels in a LCD panel are composed of 3 sub-pixels each of which is addressable by a column and row multiplexer which has to address some 6,220,800 sub-pixels. These sub-pixels are each supported by at least a dozen discreet components comprised of Thin Film Transistors, capacitors and resistors. Control circuitry laid out on the LCD panel substrates are connected through thousands of traces of ITO. Additionally, LCD panels require large light sources, diffusors, polarizer sheets and a color filter film. In all, there are millions of components required to support LCD panels.

The inventor recognized a need to first eliminate the requirement for light diffusors, polarizers and color films to provide red, blue and green light to the LCD panel and millions of discreet components. Embodiments address this need, and also address elimination of the LCD panel.

The present invention uses a lighting technology called Field Induced Polymer ElectroLumuinescence, referred to as FIPEL lighting. The present invention makes us of a FIPEL panel or panels to eliminate components in the display assemblies of digital televisions.

FIPEL panels have the distinguishing feature of being able to emit colored light from any point on the CIE index. An embodiment makes use of this feature of FIPEL light panels by setting the color balance of the television by varying the color of the light being transferred to the LCD array panel from a FIPEL backlight. This alleviates the necessity of controlling the color balance of the sub-pixel driver level on more than 4 million sub-pixels.

In another embodiment the FIPEL panel color balanced backlight is divided into a plurality of individual panels where the color balance of each subpanel is separately controlled. This allows the television to change the color temperature of the different portions of the display to enhance the viewing experience.

In another embodiment, the FIPEL panel is adhered directly to the back of the LCD panel assembly eliminating the normal diffusor and polarization sheets that evens out the light from the backlight assembly.

In another embodiment, plastic substrates used to construct the FIPEL panels have colored microdots on a the normal color film used to present colored light to LCD panels placed onto the emitting plastic substrate of the FIPEL panel.

In another embodiment, the plastic substrates used to construct the FIPEL panels have colored microdots directly on the light emitting substrate to present colored light to LCD panel. The emitting substrate may be polarized and aligned to the LCD pixel gates of the LCD panel.

In another embodiment, the FIPEL panel is subdivided into individual sub-pixels. These sub-pixel size FIPEL panels have colored microdots deposited over each sub-pixel panel thereby eliminating the need for an LCD panel assembly. The FIPEL panel becomes the display panel.

In another embodiment, the FIPEL panel is subdivided into individual panels the size of pixel groups in which the colored microdots are not needed because the color of each sub-pixel is controlled through frequency modulation of the alternating current used to turn each of the FIPEL sub-pixel panels on.

Figure 1A:
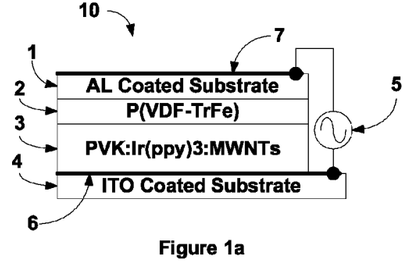
FIGS. 1A-1B show a FIPEL device that emits light.
Figure 1B:
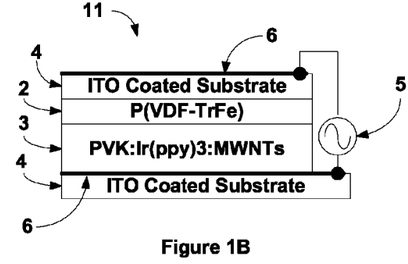

To appreciate the simplicity of FIPEL devices, reference FIGS. 1A and 1B.

FIGS. 1A and 1B illustrate single dielectric FIPEL devices 10 and 11. The basic construction of these FIPEL devices is discussed in the following.

Lab quality FIPEL devices are generally fabricated on glass or suitable plastic substrates with various coatings such as aluminum and Indium tin oxide (ITO). ITO is a widely used transparent conducting oxide because of its two chief properties, its electrical conductivity and optical transparency, as well as the ease with which it can be deposited as a thin film. Because of this, ITO is used for conducting traces on the substrates of most LCD display screens. As with all transparent conducting films, a compromise must be made between conductivity and transparency, since increasing the thickness and increasing the concentration of charge carriers will increase the material's conductivity, but decrease its transparency. The ITO coating used for the lab device discussed here is 100 nm. In FIG. 1A emission substrate 4 is coated with ITO coating 6 residing against PVK layer 3. In FIG. 1B ITO coating is on both substrates as shown.

The other coated substrate is constructed of aluminum (AL) coating 7 deposited on substrate 1. The resulting thickness of the AL deposition is sufficient to be optically opaque and reflective. To ensure that any light from emissive layer 3 that travels toward substrate 1 is reflected and directed back through emissive substrate 4 with ITO coating 6 for devices illustrated in FIG. 1A. If it is desired that light be emitted through both substrates, a substrate 4 with an ITO coating 6 will be substituted for substrate 1 with AL coating 7 as shown.

The differences between the two similar substrates is how ITO coating 6 is positioned. In FIG. 1A, emissive ITO coating 6 is positioned such that ITO coating 6 on substrate 4 is physically in contact with PVK layer 3. In FIG. 1B, substrate 1 with Al coating 7 (FIG. 1A) is replaced with substrate 4 with ITO coating 6 not in physical contact with the P(VDF-TrFe) layer 2. This allows light to be emitted from both the top and bottom surfaces of the FIPEL device.

Dielectric layer 2 in all cases is composed of a copolymer of P(VDF-TrFE) (51/49%). The dielectric layer is generally spin coated against the non-AL coated 5 side of substrate 1 or non-ITO coated 6 of substrate 4 of the top layer (insulated side). In all cases the dielectric layer is approximately 1,200 nm thick.

Emissive layer 3 is composed of a mix polymer base of poly (N-vinylcarbazole):fac-tris(2-phenylpyridine)iridium (III) [PVK:Ir(ppy)3] with Medium Walled Nano Tubes (MWNT). The emissive layer coating is laid onto the dielectric layer to a depth of approximately 200 nm. For the lab devices with the greatest light output the concentration of MWNTs to the polymer mix is approximately 0.04% by weight.

When an alternating current is applied across the devices shown in FIGS. 1A and 1B (asymmetrical devices containing 1 dielectric layer) the emissive layer emits light at specific wavelengths depending on the frequency of the alternating current. The alternating current is applied across the conductive side of the top substrate 1 (Al coating 5) or substrate 4 and the conductive side (ITO coating 6) of bottom substrate 4. Light emission comes from the injection of electrons and holes into the emissive layer. Holes follow the PVK paths in the mixed emissive polymer and electrons follow the MWNTs paths.

Carriers within the emissive layer then recombine to form excitons, which are a bound state of an electron and hole that are attracted to each other by the electrostatic force or field in the PVK host polymer, and are subsequently transferred to the Ir(ppy)3 guest, leading to the light emission.

The frequency of the alternating current applied across the substrates of the FIPEL panel can also determine the color of light emitted by the panel. Any index on the CIE can be duplicated by selecting the frequency of the alternating current. Signal generator 5 may be of a fixed frequency which is set by electronic components or set by a computer process that is software controlled. In this embodiment, the controlling software may consist of algorithms to balance white color or may determine the frequency based on hardware registers or data containing in the digital stream transporting the content to be displayed.

FIG. 2 is a schematic depiction of a typical LCD panel that would receive light from either an edge lit or LED direct lighted backlight panel. In this depiction, diffusor 21 receives light 25 from a light source. Diffusor 21 evens out differences in the received light 25 and passes the processed light to polarizer sheet 22. Polarizer sheet 22 gives the light the same polarized alignment the LCD gates have in LCD panel 24. After the light passes through polarizer 22, it passes through color filter 23. Color filter 23 is a thin sheet or film on which is printed or deposited microdots that are Red, Blue and Green. The microdots on color filter 23 are aligned with the pixel group sub-pixels making up LCD array panel 24. Light that is subsequently passed through LCD array panel 24 then passes through another polarizer sheet 22 to realign the light exiting from LCD array panel 24. This another polarizer sheet 21 cleans up any misalignment of the exiting light and enhances the viewing experience. Including diffusor sheet 21 there are 5 discreet components making up the LCD panel assembly.

Embodiments describe reducing the number of these components.

Figure 3:
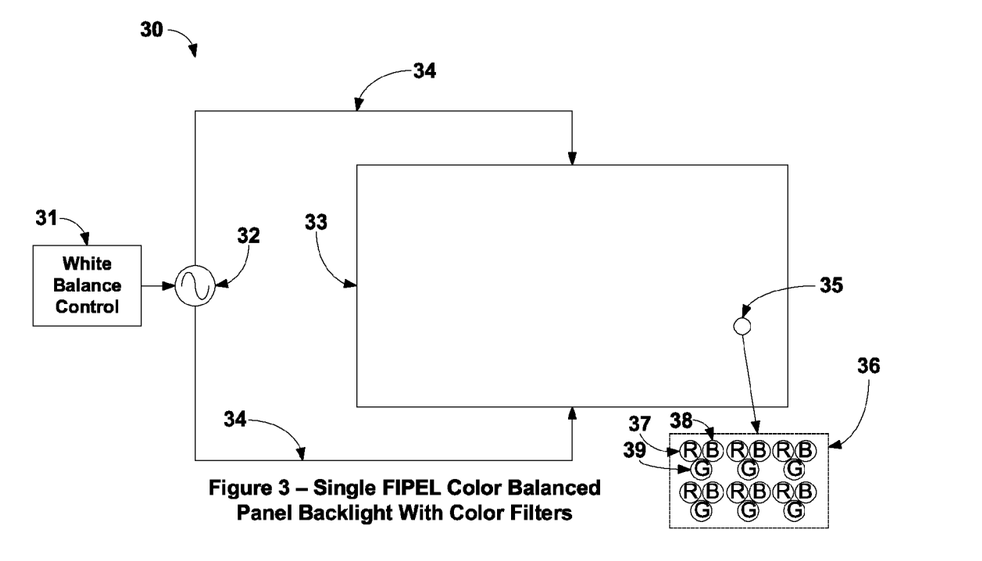
FIG. 3 shows a Single FIPEL Color Balanced Panel Backlight With Color Filters.

FIG. 3 is a schematic depiction of a single FIPEL panel that eliminates diffusor sheet 21, one of the polarizer sheets 22 and color filter 23. In FIG. 3, FIPEL panel 33 receives alternating current at an appropriate frequency determined by White Balance Control 31. Signal Generator 32 provides current frequency set by white balance control 31. White balance control 31 defaults the frequency that will result in a backlight that will provide light with a color temperature of 6,500 Kelvin. If data contained in the video stream or in a menu setup option indicates that a color temperature other than 6,500 Kelvin should be used, white balance control 31 will change the frequency delivered to signal generator 32 such that a light will be emitted from FIPEL panel 33 that is other than 6,500 Kelvin.

The alternating current delivered by signal generator 32 is delivered to FIPEL panel 33 via conductors 34.

FIPEL panel 33, in this embodiment has emitting substrate 4 as a polarized plastic material that emits light with a polarization aligned to the same polarized alignment as the spatial light modulator, here, LCD gates have in LCD panel 24. The same substrate 4 also has microdots deposited on the outside surface of substrate 4 arranged in triplets of red, glue and green. The microdots on the outside surface of substrate 4 are aligned with the pixel group sub-pixels making up LCD array panel 24.

FIG. 3 reference 35 shows pixel groups magnified and depicted as 36. The pixel group shown in the upper left corner of depiction 36 shows 3 sub-pixels 37 (Red), 38 (Blue) and 39 (Green). The emissive surface of FIPEL panel 33 is in physical contact with LCD array panel 24. Polarizer sheet 22, shown in FIG. 2, on the light emitting side of LCD array panel 24 is still included in depiction 30 FIG. 3. This embodiment has eliminated diffuser sheet 21 and one of polarizer sheets 22 and color film 23 shown in FIG. 2. An added benefit of this embodiment is that FIPEL panel 33 controlled by white balance control 31 and signal generator 32 has also eliminated a large number of white balance logic that sets a baseline level for all of the red and blue sub-pixels in LCD array panel 24.

Figure 4:
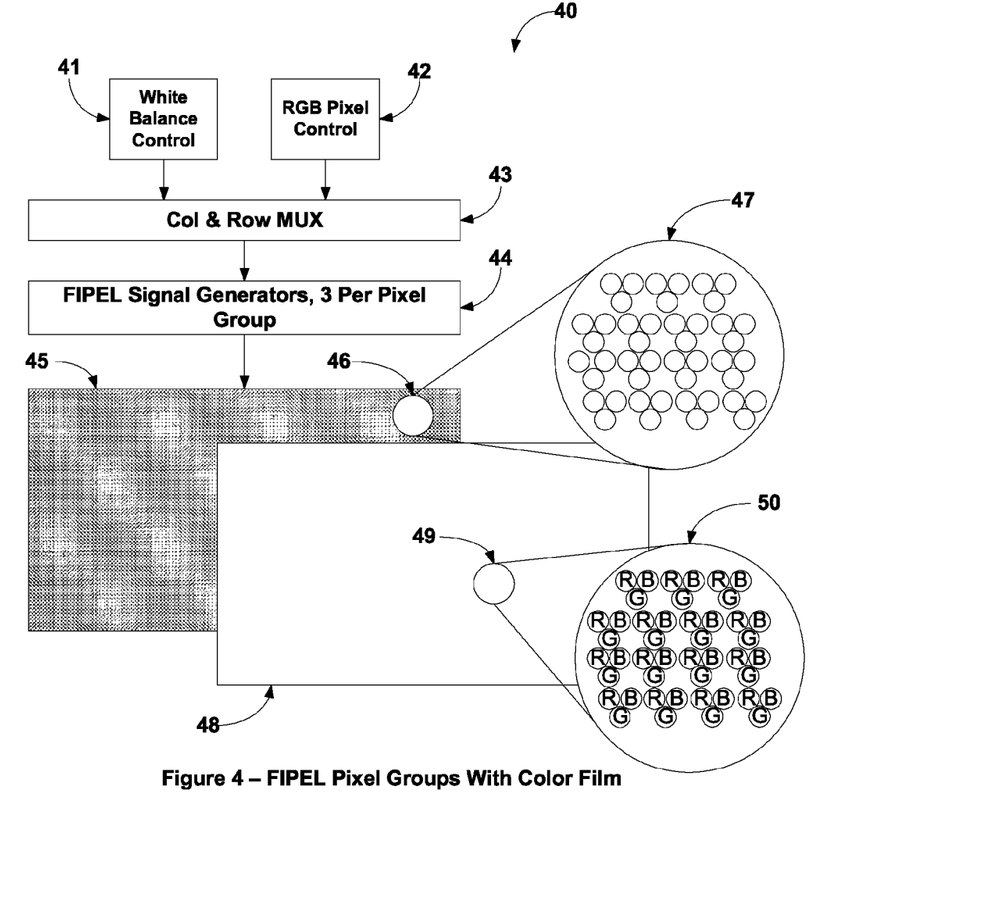
FIG. 4 is a depiction of a FIPEL Pixel Groups With Color Film.

FIG. 4 is a schematic depiction of an embodiment 40 that not only eliminates diffuser sheet 21, one of the polarizer sheets 22 and color filter 23 but also LCD array panel 24 and the remaining polarizer sheet 22 normally adhered to the front or light emitting side of LCD array panel 24.

In this depiction, FIPEL panel 45 is an assembly of a plurality of pixel groups with each FIPEL panel the size of a sub-pixel. In this depiction, FIPEL array panel 45 is composed of pixel groups depicted as 47 which is a magnified view of 46. 47 is a depiction of 15 pixel sub-groups. In this embodiment, the individual FIPEL sub-pixels emit white balanced light from emission substrate 4. Color filter film 48 is adhered to the front surface of FIPEL array panel 45 where the colored microdots on color filter film 48 are depicted as 50 which is a magnified view of sub-pixel microdots 49. Note that microdot sub-pixels are arranged as pixel groups with each pixel group having 3 sub-pixels of Red, Blue and Green.

This embodiment uses col & row MUX 43 to drive the Fipel signal generators 44, much that same as a column and row MUX driven by RGP pixel control 42 in a normal LCD television with the exception of white balance control 41 that manages the white balance output of each FIPEL sub-pixel and elimination of the TFTs, capacitors and resistors and millions of unnecessary ITO control logic traces.

This embodiment results in a display panel composed of flexible materials allowing for bendable displays.

Figure 5:
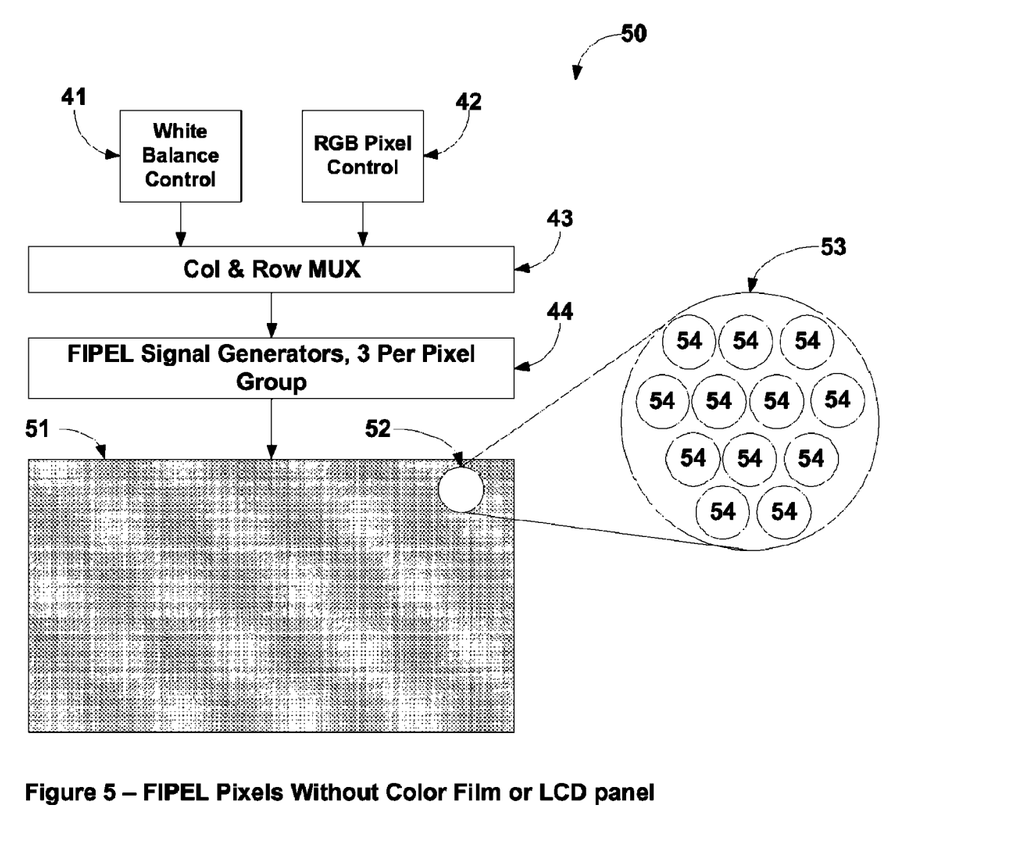
FIG. 5 is a depiction of FIPEL Pixels Without Color Film or LCD panel.

FIG. 5 is a schematic depiction that is an evolution of the embodiment depicted in FIG. 4. In FIG. 5, the number of FIPEL sub-pixels is reduced by ⅔s and the color filter film 23 of FIG. 2 is eliminated.

In this embodiment, FIPEL panel 51 is an assembly of a plurality of pixels with each FIPEL panel the size of a single pixel group. In a normal LCD display of 1080 vertical columns and 1920 rows there are 2,073,600 pixel groups with 6,220,800 sub-pixels. Each of these sub-pixels is separately addressed through col & row MUX 43. Each of these sub-pixels also has control components such as Thin Film Transistors (TFT), capacitors and resistors. LCD panels require millions of discreet components to be able to operate. In this embodiment there are only 2,073,600 FIPEL pixels requiring no TFTs, capacitors or resistors.

This embodiment also allows for a simplified col & row MUX which only addresses the FIPEL pixels. Instead of addressing individually red, green and blue as in the prior art, this system recognizes that FIPEL devices can emit light color from any index point in the CIE chart and hence uses each pixel of the FIPEL device as an individual color. Hence, this embodiment does not need a color film 23 of FIG. 2 or 48 of FIG. 4. Also, this embodiment addresses one unit for each pixel, ⅓ the addressing of conventional devices.

This embodiment requires circuitry to deliver a controlled frequency alternating current to each of the FIPEL pixels. Also, considering that the supporting structure for the FIPEL array panel 51 can be flexible, the display assembly becomes bendable much like the embodiment depicted in FIG. 4.

This technique can also be used with the new Samsung screen technology called Electro-wetting Displays which may have backlights or have only have reflective back surfaces that reflect ambient light. A FIPEL panel of the type shown in the embodiments can provide both. When the FIPEL panel is active with this type of display, the display is using a backlight. When the FIPEL panel is turned off, the reflective back surface of the FIPEL panel is reflective. This gives the Electro-wetting Display the best of both worlds.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended for cover any modification or alternatives which might be predictable to a person having ordinary skill in the art. For example, other sizes and thicknesses can be used.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, display port, or any other form. This may include laptop or desktop computers, and may also include portable computers, including cell phones, tablets such as the IPAD™, and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A display system, comprising
   an emissive body, having an emissive layer having an emissive surface formed of a polymer material that emits light, and another material on a first side of said polymer material, the emissive surface arranged into multiple rows and columns on said surface, the rows and columns being separately controllable by a row and column multiplexer,
   an intersection of each row and column defining a pixel,
   an array of three color filters arranged on a second side of the emissive surface, to be on an outside of the emissive surface, at each of said intersections,
   each pixel being separately controllable, to emit light separately from said polymer material,
   where the light emitted from the emissive surface is created at specific wavelengths depending on a frequency of alternating current, and the light is emitted by injection of electrons and holes into the emissive layer,
   and each pixel having a white balance control that controls a color of light emitted from the surface into the array of color filters for each pixel separately, to control a white balance of emitted color of the pixel separate from control of other pixels,
   where said white balance of each of said pixels is controllable via controlling a frequency of a frequency generator that is connected to inject said electrons and holes into the emissive layer,
   said display system separately controlling all of red, green and blue outputs via said row and column multiplexer and also via said frequency generator.

2. The display system as in claim 1, wherein the emitting emissive surface is a polarized plastic material that emits light with a polarization of a specific alignment.

3. The display system as in claim 2, further comprising a controllable spatial light modulator, having multiple individual controllable pixels, said multiple pixels being illuminated by said emissive body, and said pixels each modulating light from said emissive body.

4. The display system as in claim 3, wherein said polarized plastic material is polarization aligned to the spatial light modulator.

5. The display system as in claim 3, wherein said spatial light modulator is liquid crystal, forming a liquid crystal display.

6. The display system as in claim 5 wherein said spatial light modulator is composed of elements that are one of: TFT, VA, IPS, IGZO or an electrowetting display.

7. This display system as in claim 1 wherein the display system is in a portable computer.

8. The display system as in claim 7, wherein said portable computer is one of a tablet, cell phone, or PDA.

9. The display system as in claim 1, wherein the display system is a television.

10. A method of displaying, comprising
controlling emitting of light from an emissive layer having an emissive surface formed of a polymer material that emits light in multiple rows and columns on said surface, said controlling using electrical connection between said surface and another material that is on a first side of said surface;
defining an intersection of each row and column as being a pixel,
providing an array of three color filters arranged on a second side of the emissive surface, to be on an outside of the emissive surface, at each of said intersections;
said controlling comprising using a row and column multiplexer to separately control the rows and columns to control each pixel to emit light separately from said polymer material, where the light emitted from the emissive surface is created at specific wavelengths depending on a frequency of alternating current, and the light is emitted by injection of electrons and holes into the emissive layer,
said controlling a color of light emitted from the surface into the array of color filters for each pixel separately, to control white balance control on a pixel by pixel basis via controlling a frequency of a frequency generator;
controlling at least a part of a color of each said pixel using said white balance control that is controlled using said row and column multiplexer, and controlling all of red, green and blue outputs using said controlling.

11. The method as in claim 10, wherein the emissive surface is a polarized plastic material that emits light with a polarization of a specific alignment and further comprising emitting polarized light from said surface.

12. The method as in claim 11, further comprising controlling a controllable spatial light modulator, having multiple individual controllable pixels, said multiple pixels being illuminated by said emissive surface, and said pixels each modulating the light from said emissive surface.

13. The method as in claim 12, wherein said polarized plastic material is polarization aligned to the spatial light modulator.

14. The method as in claim 12, wherein said spatial light modulator is liquid crystal, forming a liquid crystal display.

15. The method as in claim 14 wherein said spatial light modulator is composed of elements that are one of: TFT, VA, IPS, IGZO or an electrowetting display.

16. The method as in claim 11, wherein said color filter is directly adhered to said emissive surface.

17. The method as in claim 10, wherein there are multiple ones of said frequency generators, which are variable in frequency to vary colors of each pixel, said frequency generators connected to said pixels by said row and column multiplexers.

18. This method as in claim 10 wherein the method controls a portable computer.

19. The method as in claim 18, wherein said portable computer is one of a tablet, cell phone, or PDA.

20. The method as in claim 10, wherein the method controls a television.

* * * * *